United States Patent [19]

Krofta

[11] Patent Number: 5,160,611
[45] Date of Patent: * Nov. 3, 1992

[54] APPARATUS FOR AERATING WATER

[75] Inventor: Milos Krofta, Lenox, Mass.

[73] Assignee: Lenox Institute for Research, Inc., Lenox, Mass.

[*] Notice: The portion of the term of this patent subsequent to Jun. 5, 2007 has been disclaimed.

[21] Appl. No.: 756,323

[22] Filed: Sep. 6, 1991

Related U.S. Application Data

[63] Continuation of Ser. No. 525,890, May 17, 1990, Pat. No. 5,078,861, which is a continuation of Ser. No. 241,384, Sep. 7, 1988, Pat. No. 4,931,175.

[51] Int. Cl.$^5$ .............................................. C02F 1/24
[52] U.S. Cl. ........................... 210/205; 210/221.2; 210/540; 261/23.1; 261/122.1
[58] Field of Search ............... 210/86, 94, 104, 221.1, 210/221.2, 520, 521, 525, 528, 530, 205, 207, 541, 538, 540; 261/23.1, 122

[56] References Cited

U.S. PATENT DOCUMENTS

| | | | |
|---|---|---|---|
| 855,243 | 5/1907 | Green et al. | 261/23.1 |
| 1,020,013 | 3/1912 | Arbuckle | 210/521 |
| 2,431,936 | 12/1947 | Hudson | 261/23.1 |
| 2,874,842 | 2/1989 | Krofta | 210/540 |
| 3,067,878 | 12/1962 | Genter et al. | 210/521 |
| 3,182,799 | 3/1965 | Krofta | 210/117 |
| 3,452,809 | 7/1969 | O'Neill | 210/520 |
| 4,022,696 | 5/1977 | Krofta | 210/520 |
| 4,184,967 | 1/1980 | Krofta | 210/525 |
| 4,377,485 | 3/1983 | Krofta | 210/221.2 |
| 4,500,793 | 2/1985 | Kuramoto | 210/94 |
| 4,626,345 | 12/1988 | Krofta | 210/221.2 |
| 4,790,944 | 12/1988 | Gorden et al. | 210/221.2 |
| 4,931,175 | 6/1990 | Krofta | 210/521 |

FOREIGN PATENT DOCUMENTS

88/03433 5/1988 PCT Int'l Appl. .

Primary Examiner—Stanley S. Silverman
Assistant Examiner—Christopher Upton
Attorney, Agent, or Firm—Wolf, Greenfield & Sacks

[57] ABSTRACT

Water clarifying apparatus has a cylindrical tank where particulate contaminants suspended in raw water are separated using flotation techniques. The treatment capacity of such a unit is increased by using a set of concentric, mutually spaced, conical plates positioned in the flotation tank. The apparatus utilizes air dissolving tubes operating in parallel that have common feeds and discharges coupled through three way valves operated to pressurize a closed volume of water with high pressure air in one tube while reloading and discharging the other tube.

6 Claims, 14 Drawing Sheets

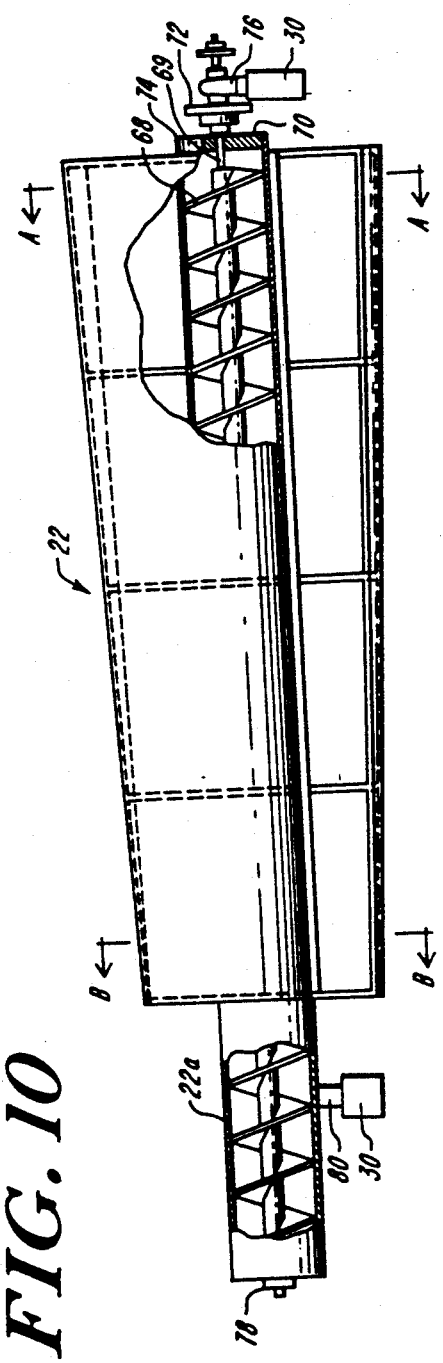
FIG. 10
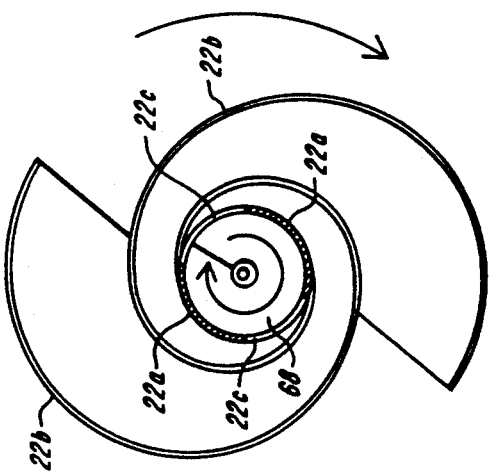
FIG. 11A
FIG. 11B

APPARATUS FOR AERATING WATER

This application is a continuation of application Ser. No. 07/525,890, filed May 17, 1990, now U.S. Pat. No. 5,098,861, which is a continuation of application Ser. No. 07/241,384 filed Sep. 7, 1988, now U.S. Pat. No. 4,931,175.

BACKGROUND OF THE INVENTION

The present invention relates to apparatus for the clarification of water where the removal of suspended particles is accomplished by flotation using a stream of rising, microscopic air bubbles, and usually a flocculation agent. More specifically, it relates to an improved clarification apparatus characterized by a shallow, cylindrical flotation tank and a rotating scoop for removal of floated sludge of the type described in U.S. Pat. Nos. 4,022,696; 4,377,485; and 4,626,345.

Water clarification, the removal of particulate contaminants suspended in water, is used to treat waste water from manufacturing processes, particularly in the paper and pulp industries, in the treatment of municipal water drinking supplies, and in sewage treatment. The water can be clarified by sedimentation or flotation of the particles. Known sedimentation techniques and apparatus are efficient, but are limited even at peak efficiency to a comparatively slow sedimentation rate, about 0.5 gallons per minute per square foot. To handle large volumes of raw input water, sedimentation facilities must therefore be large, with attendant cost and space utilization disadvantages.

Flotation techniques dissolve a few percent of air by volume in pressurized water and then release the air in the form of microscopic bubbles which attach to the particles and carry them upwardly to the surface where they form a floating sludge. The particles are usually flocculated using conventional flocculating agents such as alum before the air bubbles are introduced. Flotation techniques are theoretically capable of achieving clarification rates of 7.5 gallons per minute per square foot of flotation area. Heretofore in practice the rates have been less than this theoretical value, but significantly better than for sedimentation techniques.

Known apparatus to dissolve air in pressurized water use a single tube which is valved to admit water which is pumped to a high pressure, a typical value being 6 atmospheres. Since water is substantially incompressible, it requires a large power input to a centrifugal pump to produce this pressure level. Compressed air is added to the pressurized water, preferably with the water swirling through a zone in the tube where the compressed air is introduced in order to enhance the dissolution of the air into the water. After a sufficient mixing, water reaches an outlet where a valve discharges to a low pressure pipe, typically at 2 atmospheres, which directs the pressurized, aerated water to a discharge manifold, or the like, in the flotation tank.

Applicant holds several U.S. patents for water clarification apparatus and processes. Early attempts described in U.S. Pat. No. 2,874,842 issued in 1959 and U.S. Pat. No. 3,182,799 issued in 1965 used a stationary tank with no skimmers or other moving components in the tank. The gas bubbles were introduced via the main raw water inlet and guided within the tank by an internal deflector ('842) or a stack of internal baffles ('799). Because the gas bubbles were guided by stationary components, there was no design problem created by the turbulence of moving parts in the flotation tank. Also these devices did not lend themselves to treatment at high flow rates. The '799 apparatus had the additional problems in that (i) the inlet water had to be separately fed from the side to the region between each adjacent pair of baffles and (ii) the flow paths for floated particles varies depending on the vertical position of the associated baffles defining the flow path. This latter situation means that the apparatus either does not fully treat the inlet water or is slow.

Significant improvements were presented in applicant's U.S. Pat. Nos. 4,022,696; 4,377,485; 4,626,345; and 4,184,967. In the '696 clarifier, sold under the trade designations "SPC" and "Supracell", the flotation occurs in a circular tank. The raw water is fed into the tank via a central pipe, a hydraulic joint, and an inlet pipe with multiple outlets immersed in the tank which rotates about the tank. The inlet flow is oriented opposite to the direction of rotation of the inlet pipe and is at a velocity with respect t the rotation rate such that the raw water has a net zero velocity as it enters the tank. The raw water inlet flow assembly and a scoop for removing the floated sludge are mounted on a carriage that rotates about the tank. The rate of rotation is set so that the floated particles will reach the surface of the water held in the tank in the time of one rotation. Flocculation occurs in a flocculation chamber, an assembly of walls, pipes and baffles, that is immersed in the flotation tank and rotates around the tank supported by the carriage. Dissolved air is introduced to the flotation tank by a rotating manifold that follows the flocculation chamber. The net zero velocity results in a substantially vertical path for the rising air bubbles and attached flocs. With a flotation rate of approximately 12 inches per minute, a good degree of clarification can be achieved with each rotation of the carriage using a comparatively shallow tank, e.g. 16–18 inches.

In practice the '696 invention has proven to be a highly effective clarification unit, particularly when used with the multi blade rotating scoop of applicant's U.S. Pat. No. 4,184,967. This scoop has a central sludge discharge pipe that receives sludge scooped by the blades. There are openings in the pipe which allow the sludge to enter the center of the pipe. The pipe is inclined so that the sludge flows downhill within the pipe to a collection compartment.

U.S. Pat. No. 4,377,485 discloses a later clarifier of the present applicant sold under the trade designations "SAF" and "Sandfloat", which utilizes the basic approach of the '696 invention, also operating with the net zero velocity principle, but also adding a second filtration stage with a set of wedge shaped sand beds covering the bottom of the flotation tank. The water clarified by the flotation process flows through the underlying sand beds into a clarified water collecting chamber. A suction apparatus mounted on the carriage periodically backwashes each section of the filter. As in the '696 clarifier, a rotating flocculation chamber has vertically aligned, concentric baffles. In the '485 patent, however, the baffles are corrugated so that as the carriage rotates the corrugations gently mix the raw water with the flocculating agent. When the flocs are formed, pressurized, aerated water is introduced to the open, lower end of the flocculation chamber via a manifold with multiple outlets. The bubbles carry the floced particulates upwardly to form a floated sludge layer. The '485 "sandfloat" system provides a two stage clarification, flotation and filtration, which provides an enhanced degree of clarification but with certain attendant increases in cost. The clarification rate, however is comparable to that of the '696 "supracell" clarifier.

U.S. Pat. No. 4,626,345 discloses a clarifier, sold under the trade designations "SASF" and "Sandfloat-Sedifloat". It does not utilize the net zero velocity principle, but does employ a sand bed for two stage clarification. In this apparatus, the raw water enters a central cylindrical compartment, which acts as a hydraulic flocculator, and then flows over a dividing wall into a surrounding circular flotation tank. Aerated water is added via a fixed manifold within the flotation tank. Rotating elements include a scoop remover for the floated sludge and a suction hopper that cleans the filter beds. The scoop is the same type as used with the supercell and sandfloat units described above. This '345 SASF apparatus offers a two stage clarification with a more compact unit and at a lower cost than the SAF type clarifier.

In all of these clarifiers, the Supracell, sandfloat and SASF, there are common design features and limitations. For one, the flotation of the floced particles is generally vertical, and is in a body of water that is comparatively shallow and generally free from turbulence. Also, in all of these designs the removal of the floated sludge is by a bladed, rotating scoop feeding an inclined discharge pipe. Further, a principal operating cost is the power required to operate the pumps to pressurize the raw inlet water and dissolve air in it. Also, heretofore, in order to increase the capacity of a given type of clarifier, one built a larger diameter tank. While in theory one can build a large enough tank to accommodate any clarification load, cost and space constraints have provided practical limitations on the capacities of these units.

It is therefore a principal object of this invention to provide an improved water clarification apparatus that can increase the clarification rate of any circular tank flotation type clarifier by a factor of at least two with no attendant increase in the size of the unit.

Another principal object is to provide the foregoing increase in productivity with a comparatively small increase in cost and in a manner which is compatible with existing apparatus.

A further object is to provide an improved air dissolving apparatus which significantly lowers the cost of operation of the clarifier while efficiently aerating and pressurizing the inlet water.

Yet another object is to provide an improved floated sludge removal apparatus that can remove and transport increased volumes of and more viscous floated sludge loads as compared to known circular tank clarifiers.

A further object is to provide a control system for a clarifier with the foregoing advantage that senses the sludge layer water boundary and can also sense the turbidity of the water in the flotation tank as a function of depth and in response thereto automatically controls chemical addition and coordinates the operation of the clarifier.

SUMMARY OF THE INVENTION

A water clarifier has a generally cylindrical tank, an arrangement for adding raw inlet water, preferably with a flocculating agent admixed, to the tank with a minimum of turbulence, and a distributor of pressurized, aerated water within the tank which creates a stream of microscopic air bubbles that carry flocculated particulate contaminants suspended in the water to the surface where they form a floating sludge layer. Within the flotation tank there is a set of concentric conical plates that are inclined and spaced so that they overlap one another when projected onto a horizontal plane extending transversely to the vertical axis of the plates. The plates extend circumferentially over at least a majority of the tank. The plates rotate about the tank, preferably mounted on a carriage that rides the outer rim of the tank wall and also supports (i) a multi-blade scoop that removes the floated sludge layer and (ii) a header that mixes the raw water with a flocculating agent and then distributes it in equal volumes to equal annular compartment (also defined by conical dividing walls); but ones that have an outerplate spacing that is inversely related to the radial location of the wall and ones that extend circumferentially only over a short distance. The plates are oriented with respect to the direction of rotation to produce a highly laminar flow over them as they rotate. The clarification rate of the clarifier is a function of the combined projected areas of all of the conical plates, not of the surface area of the flotation tank as in prior art devices of this type.

The clarifier includes a screw conveyor mounted to rotate within a central discharge pipe of a rotating, bladed scoop to advance the collected sludge along the discharge pipe to a collection compartment or outlet even if the sludge is collected at a high volume or is thickened or hardened. The screw preferably extends substantially the full length of the discharge pipe and is driven independently of either the mechanism for rotating the scoop blades to skim the sludge from the tank or the mechanism that rotates the carriage about the tank. The direction of rotation of the screw conveyor is preferably, but not necessarily, opposite to the direction of rotation of the scoop itself.

The clarifier also includes a detection system that senses the sludge layer water boundary within the tank and/or the turbidity of the water as a function of its depth, and therefore the location and velocity of a layer of sludge rising to the surface. The system includes a window located in the tank side wall and extending vertically over a distance that will include all expected locations of the sludge layer during operation, and preferably substantially the full height of the flotation tank, typically 16-20 inches. Adjacent the window are an array of vertically spaced light transmitter and receiver pairs, each pair being angled with respect to the window, and operating at a frequency, preferably infrared, such that the reflected radiation reaching the receiver indicates the presence or absence of floating or floated sludge within the tank. The receiver transforms the received light into a current output signal that is compared to a value for clear water to produce a digital output for a central controller which generates signals that automatically indicate or control the rate of operation of the sludge removal scoop, the rate at which clarified water is withdrawn from the tank, and the rate at which a flocculating agent is added to the inlet water.

The clarifier also includes a pair of air dissolving tubes (ADT's) operated in parallel. A common feed pump pressurizes the feed water to a low pressure, e.g., 2 atmospheres. The feed water is then directed to a first three way valve connected to both ADT's. The outlets of both ADT's located at the end opposite the inlets, lead to a second three way valve with a single outlet that feeds aerated water at a low pressure, typically 2 atmospheres, to the flotation tank. Compressed air, typically at 6 atmospheres, is fed to air inlets on each ADT via a third three way valve. An actuator is ganged to all three valves. In one limit position, the valves are positioned so that one ADT receives water while its outlet is open to discharge water aerated in the previous half cycle of operation. At the same time the inlet and outlet of the other ADT are closed while compressed air is introduced into the ADT behind a perforated panel. The air is therefore dissolved by compressing air, not by compressing water, resulting in attendant power reductions to produce the desired aeration. The inlet of each ADT is structured to produce a tangential flow at high speeds and includes an adjustable inlet opening to control the inlet flow rate and water velocity.

When operated with a sand bed for two stage clarification, the improved clarifier preferably includes clarified water outlet pipes imbedded in the sand to allow the use of deeper and multimedia sand beds and a system for introducing steam into the sand beds to provide a more effective backwashing.

These and other features and objects of the invention will be understood more fully from the following detailed description of the preferred embodiments which should be read in light of the accompanying drawings.

BRIEF DESCRIPTION OF THE DRAWINGS

FIG. 10 is a view in side elevation, with portions broken away, of the improved scoop shown in FIGS. 1-3;

FIGS. 11A and 11B are views in vertical cross section taken along the lines A—A and B—B in FIG. 10;

DETAILED DESCRIPTION OF THE PREFERRED EMBODIMENT

Figure 1:
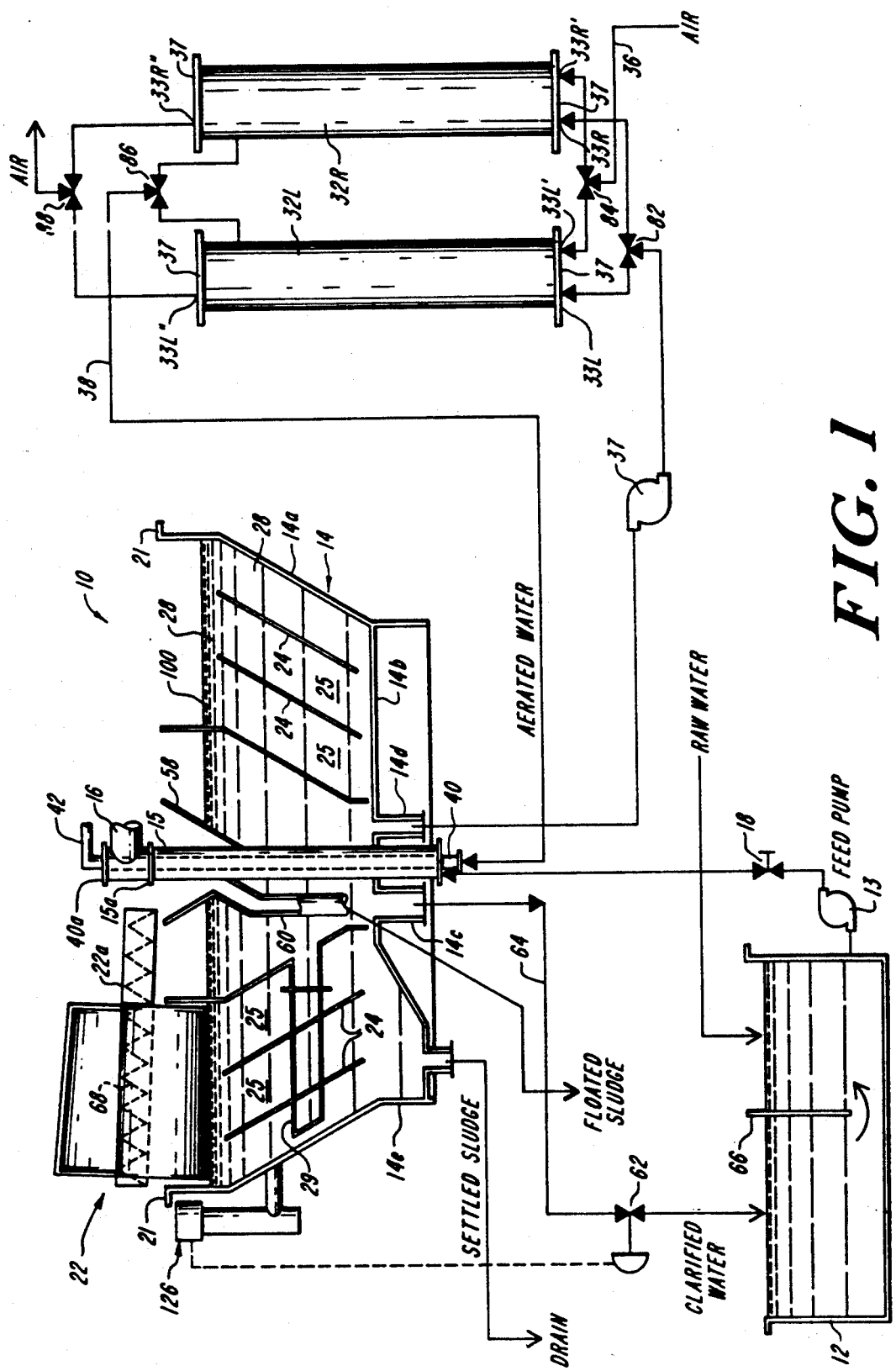
FIG. 1 is a schematic view in partial vertical section of a single stage clarifier incorporating the rotating conical plates and the parallel ADT tubes of the present invention.
Figure 2:
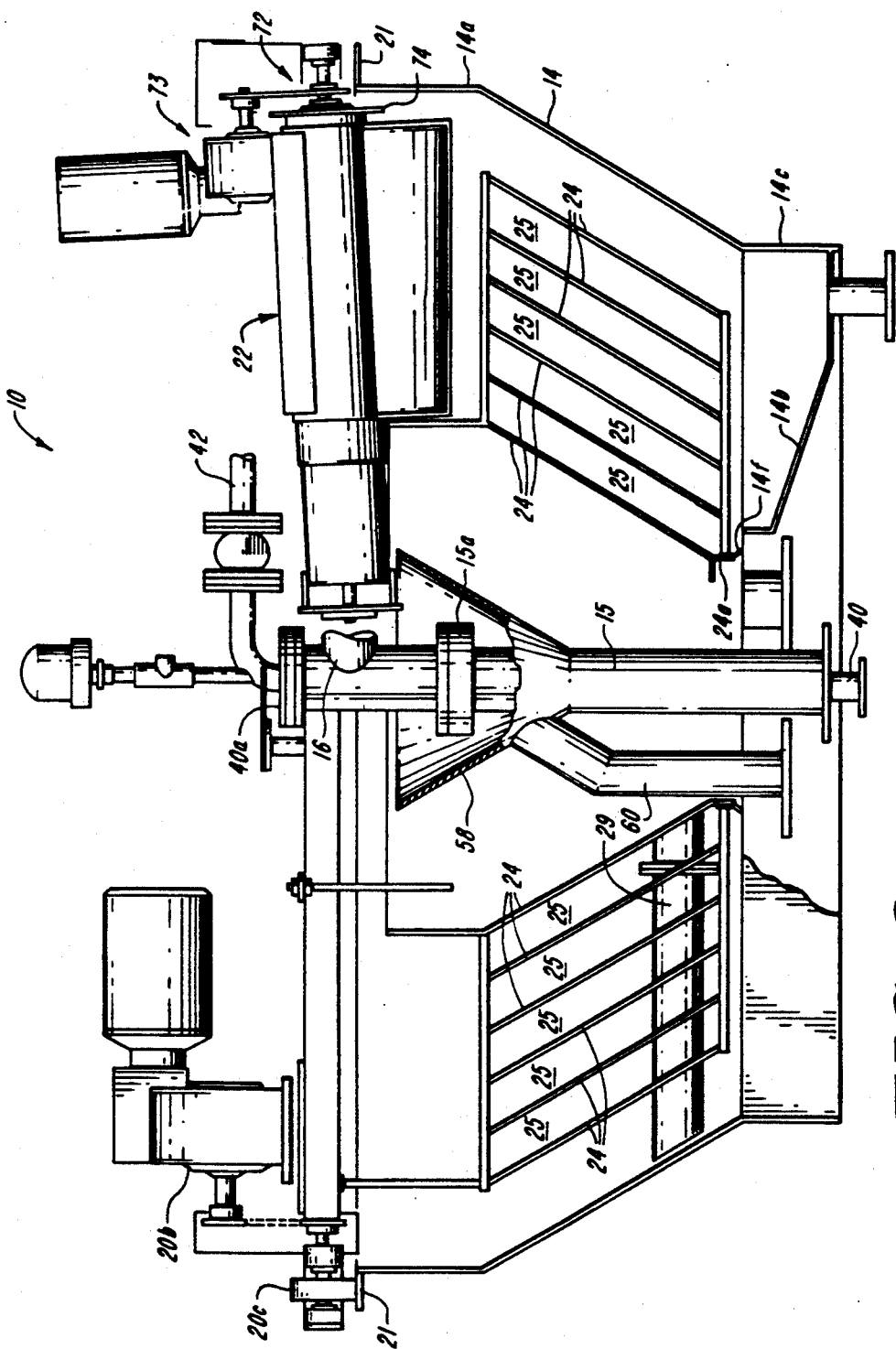
FIG. 2 is a view in vertical section and partially in side elevation of the flotation tank and associated raw water and aerated water distributors and rotating sludge removal scoop.
Figure 3:
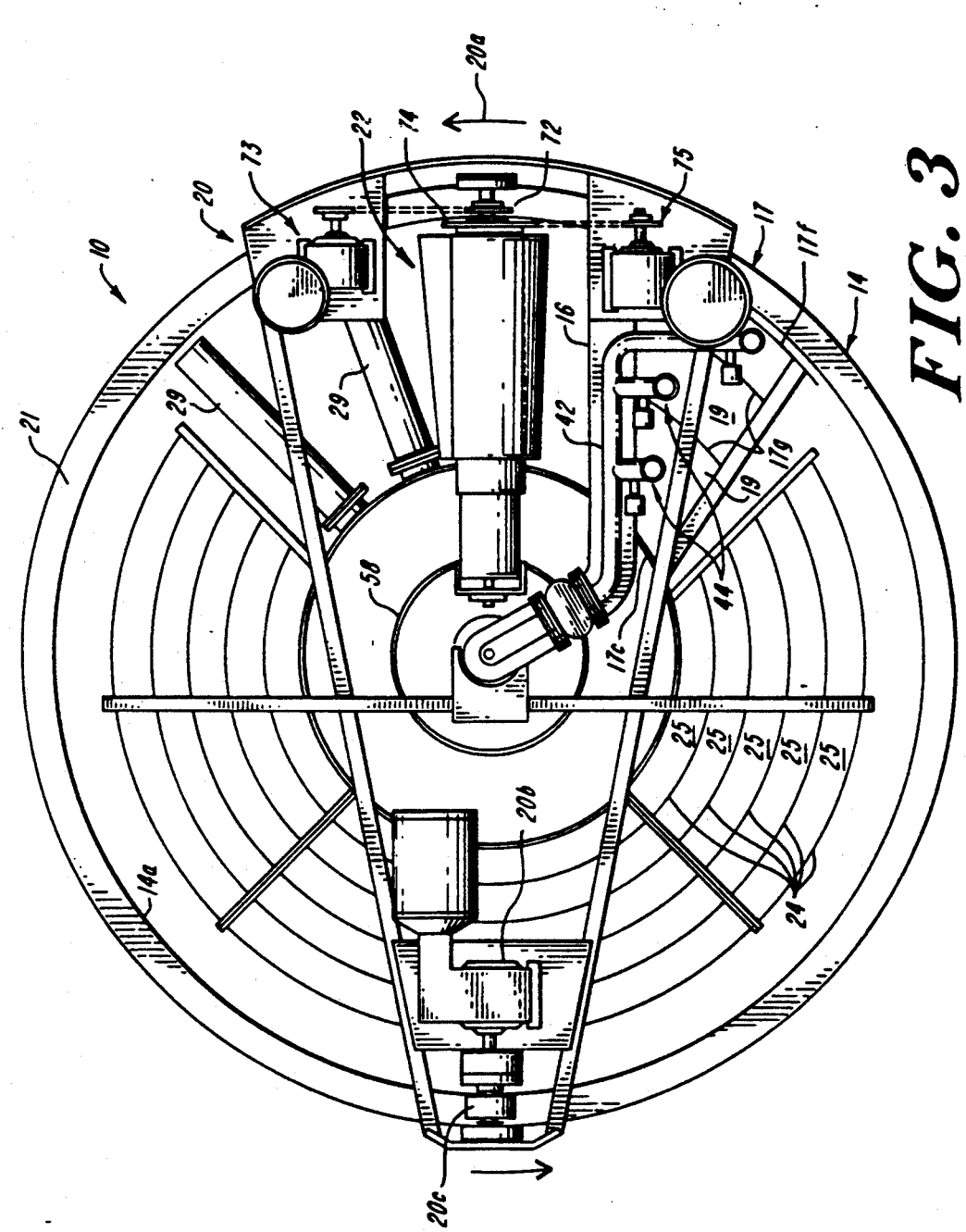
FIG. 3 is a top plan view of the flotation tank and related equipment shown in FIG. 2.

FIGS. 1-3 show a single stage, dissolved air water clarifier 10 of the Supracell type as described in U.S. Pat. No. 4,022,696. Raw water is fed to a collection tank 12 which is then directed by a feed pump 13 to a flotation tank 14 via a vertical inlet pipe 15, a rotary hydraulic joint 15a and a rotating distributor pipe 16 that extends radially to feed a header 17 (FIGS. 4A and 4B) which introduces the raw water to the tank 14 via a set of radially spaced openings 17a. A flocculation agent, such as an alum solution, is mixed with the raw water ahead of the pump 13 before it passes into the tank. The flow of raw water to the tank is controlled by a valve 18.

The header 17 extends generally radially across the flotation tank 14 and is mounted on a carriage 20 which rotates about the center of the tank indicated by the arrow 20a in FIG. 3. The header 17 mounted on the carriage 20 also rotates about the tank. The carriage is driven by a motor 20b coupled to a suitable power transmission to a drive wheel 20c which rides on the outer rim 21 at the top of side wall 14a of the tank 14. The motor 20b is preferably a variable speed dc motor which can be readily controlled to produce a varying rate of rotation of the carriage. Typically the carriage rotates at a rate of ⅛ rpm. The water level within the trough 17b is kept slightly above a zero level (100 in FIGS. 4A and 4B) which is defined as the level when a spiral scoop 22 just touches the surface of the water in the flotation tank. An upper portion 17c of the header 17 has a generally square cross sectional configuration and surrounds the raw water distributor conduit 16 to form a rapid mixing chamber for the addition of flocculating chemicals added to the feed line either before the feed pump or before the entrance of the inlet conduit 16 into the tank 14. The upper trough compartment 17c preferably includes a removable cover 17d which facilitates a cleaning or inspection of the header.

Figure 4:
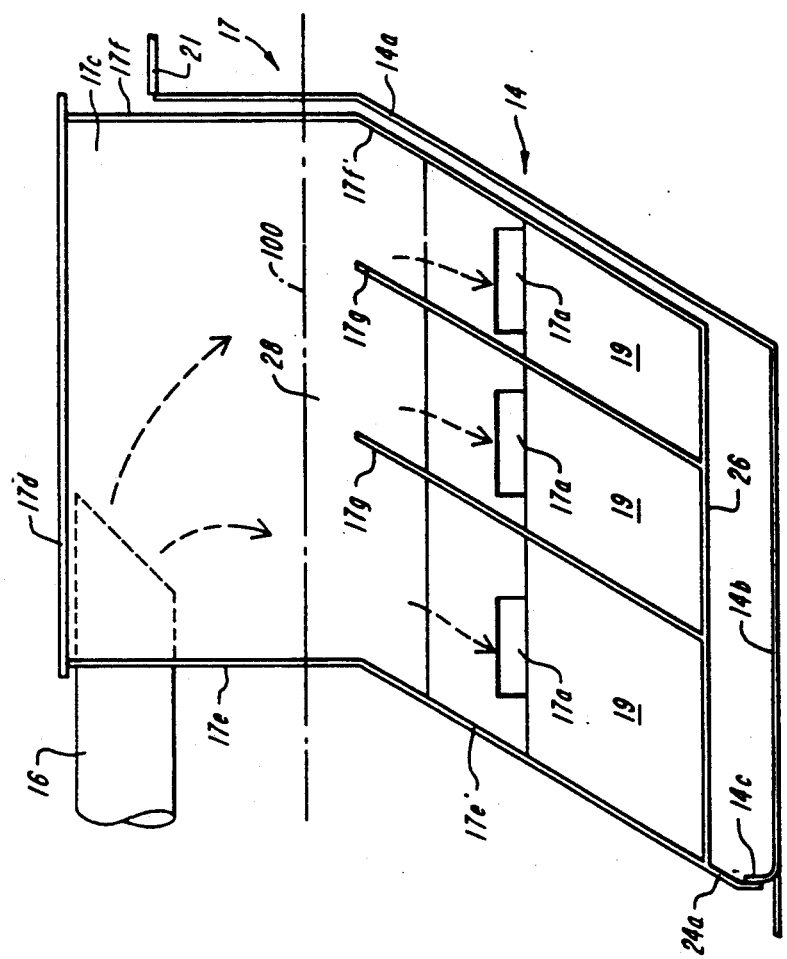
FIGS. 4A and 4B are simplified schematic view in vertical cross section and in radial section, respectively, of a header for distribution of the raw water to the clarifier shown in FIGS. 1-3.

As is best seen in FIGS. 4A and 4B, the inner and outer end walls 17e and 17f of the header have bottom portions 17e', 17f' immersed in the tank that are inclined and extend circumferentially for a sufficient distance to promote a uniform distribution of the mixed raw water as the flotation begins. The header includes divider walls 17g, also portions of cones, that define plural concentric annular sections. As is best seen in FIG. 4B, one opening 17a feeds each section 19. The openings 17a are each of the same dimensions. The radial inter wall spacing between the walls 17e', 17f and 17g is an inverse function of the radial position of each wall. As a result, since each opening 17a feeds only one section 19, variation in the wall to wall spacing accommodates for what would otherwise be an uneven distribution of the input water due to the variations in the circumferential speed of travel of the openings 17a as a function of their radial location.

The walls 17e', 17f and 17y are preferably each secured to a continuous floor plate 26 which is connected to a front wall 17g positioned immediately behind the scoop 22. The wall 17g isolates the raw water being inlet to the flotation regions 25 from turbulence created by the action of scoop 22. As is best seen in FIG. 4A, the opening 17a face the direction generally opposite to the direction of rotation of the carriage and header indicated by the arrow 20a. The inlet flow rate, the speed of rotation, and the location structure of the opening 17a is selected to produce the net zero velocity operation characteristic of the clarifier described in the forementioned U.S. Pat. No. 4,022,696. To further reduce turbulence, the innermost wall 17e preferably includes a continuous flange 17e" extending from its lower end which is in a sliding engagement with an annular, upright flange 14c projecting upwardly from the bottom wall 14b of the tank 14.

A principal feature of the present invention is a set of concentric, mutually spaced apart, conical plates 24 which are supported on the carriage 20 so that they rotate in unison with the header 17 through the flotation tank 14. The set of plates define a set of annular, inclined flotation regions 25 each defined by an adjacent pair of the conical plates 24. Each of the plates 24 is preferably generally flat in cross section and each of the plates as a whole has its axis of rotation centered on the axis of rotation of the carriage 20, so that movement of the conical plates 24 a they rotate within the tank, immersed in the water 28 held in the tank for clarification, produce a highly laminar flow that is substantially free of turbulence. This is to promote an efficient flotation of the particulate contaminants on rising microscopic air bubbles in each of the regions 25. The plates are preferably closely spaced, with a typical separation of 2 to 4 inches. Also, the plates, as is best seen in FIG. 3, extend circumferentially through most of the tank, except for a sector where the clarified water inlet pipes 29 and the scoop 22 act. With the construction described above, this provides a positive control over cross turbulence, as opposed to baffles used in Supracell and SAF type clarifiers which extend only through a flocculation region, and in the SAF design are corrugated to produce a mixing action.

A significant aspect of the present invention is that the rotating cones 24 are each inclined and closely spaced so that the projection of the plates onto a horizontal plane orthogonal to the axis of rotation of the plates overlap one another. At an angle of approximately 60° from the horizontal and with a 3 inch inter plate spacing in a standard depth tank of 16-20 inches, the overlapping is approximately 50%. This overlapping is a direct measure of the increased treatment capacity of the present invention as compared to a prior art flotation unit of the same type and dimension. It should be noted that in contrast to applicant's 1965 clarifying device using stack stationary baffles as described in U.S. Pat. No. 3,182,799, the flotation path for contaminants within each of the regions 25 is substantially the same. The angle of inclination can vary from about 30° to 90° from the horizontal. At 90° the increase in treatment capacity due to the plate overlap is eliminated, however, there is still an advantage in using the plates since they reduce cross turbulence within the tank which promotes the clarification process.

Figure 17:
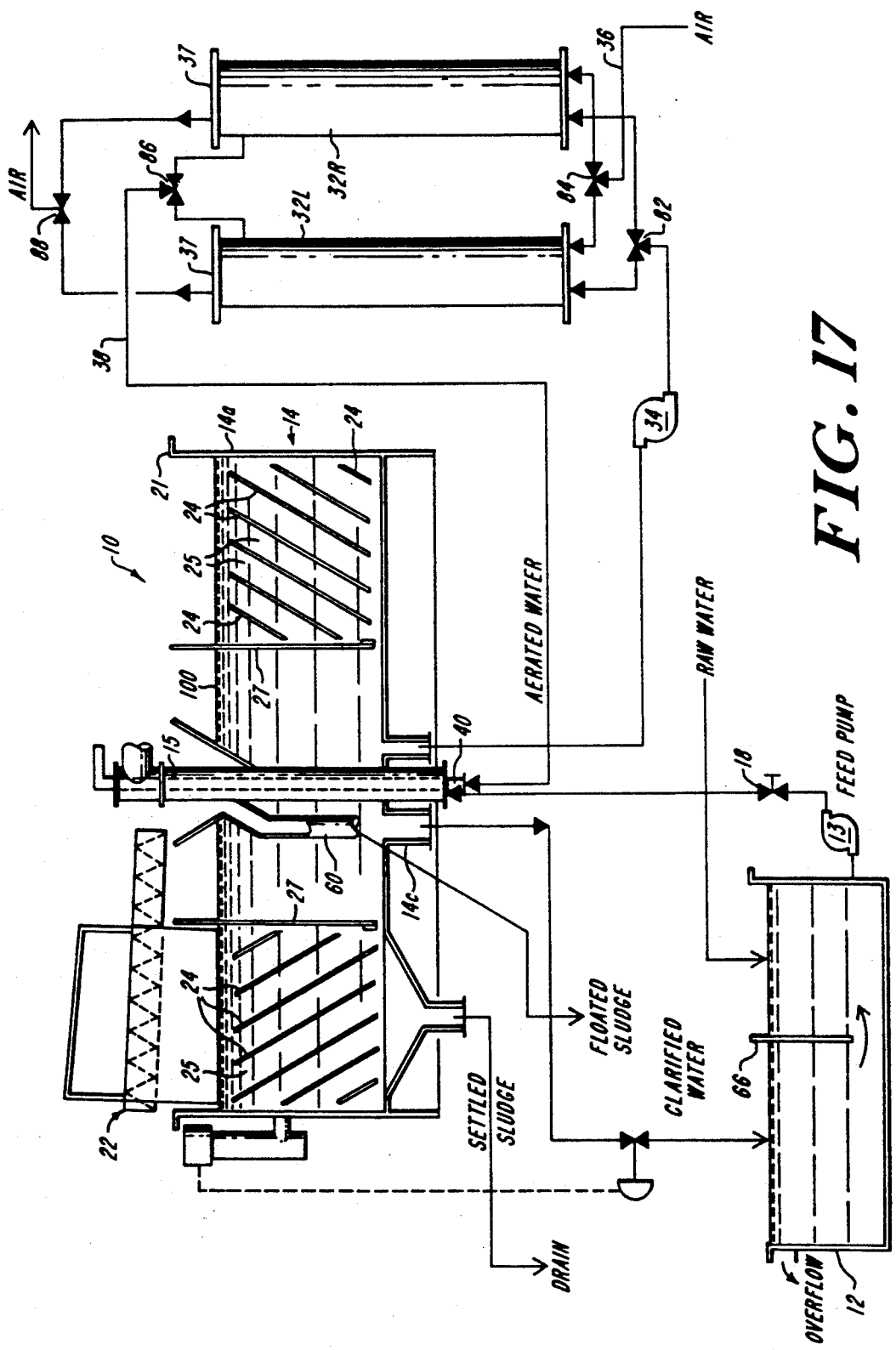
FIG. 17 is a view corresponding to FIG. 1 showing an alternative embodiment where the conical plates ar mounted in a vertical walled annular portion of the tank.

FIG. 17 shows a clarifier 10 identical to the one shown in FIGS. 1-3, except that the tank 14 has a vertical outer wall, all of the conical plates 24 are mounted within an adjoining annular region, and the flotation regions are limited by an inner vertical wall 27. Some of the conical plates, as shown, are "shorter" than others in order to fill a region which is generally rectangular in cross section. The plates may be mounted on brackets which allow an adjustment in their mutual spacing by adjusting the height and/or horizontal spacing of the plates. This FIG. 17 embodiment is less costly to manufacture while still providing the performance advantages of the present invention.

Figure 5:
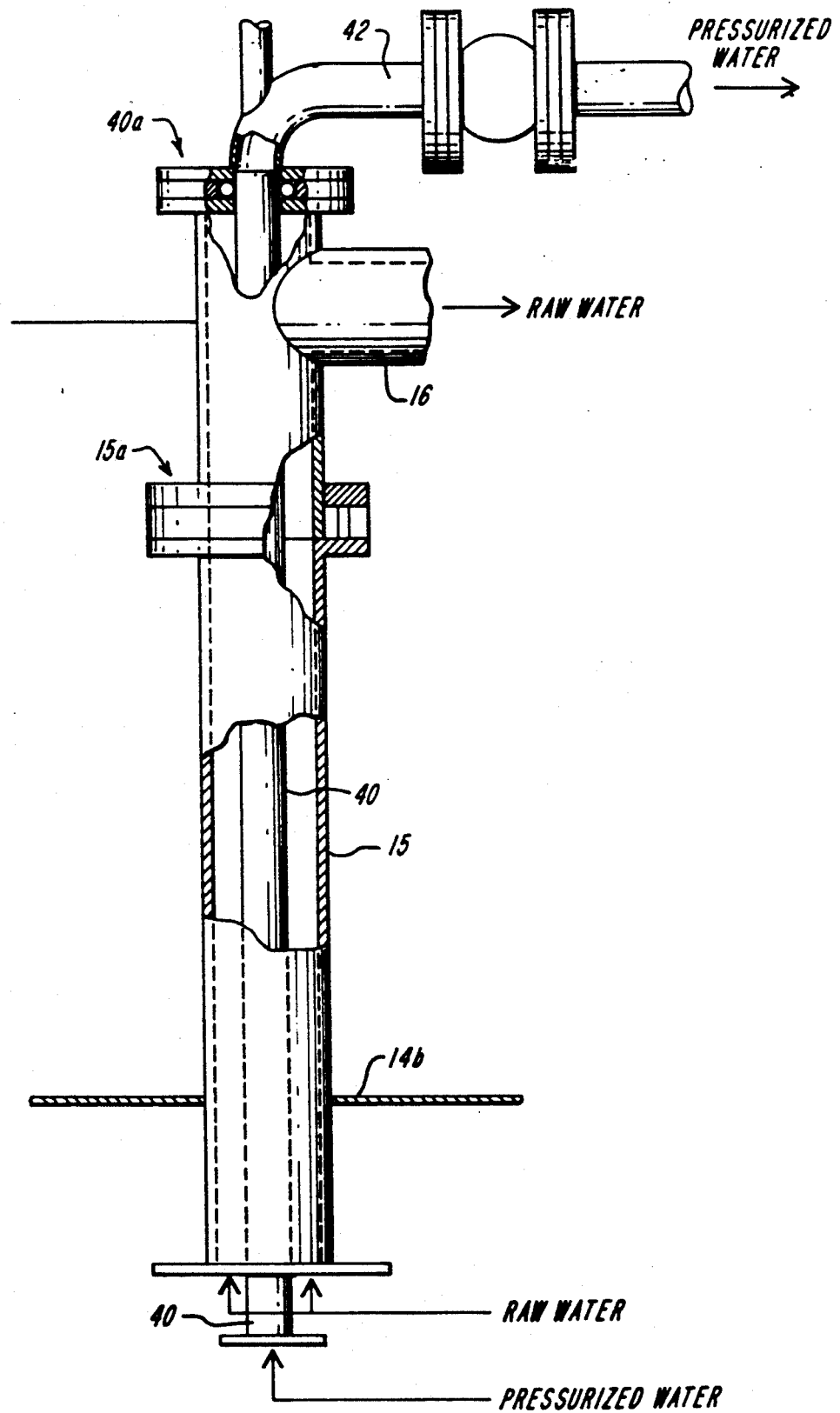
FIG. 5 is a detailed view in side elevation with portions broken away of portions of the raw and pressurized water distribution systems shown in FIGS. 1-3.

Referring to FIG. 1, the improved clarifier of the present invention utilizes a pair of air dissolving tubes (ADT's) 32L,32R. Water enters the ADT's via inlets 33L,33R, fed by a common low pressure water feed produced by a pump 34. Pressurized air enters the ADT s via inlets 33'L,33'R fed through a common inlet line 36. Both ADT s 32L,32R supply pressurized, aerated water, via their outlets 33"L,33"R, to the tank 14 via a common output line 38. As will be explained in more detail below, the ADT's operate in parallel to produce a steady flow of aerated water in the line 38 at a comparatively low pressure, typically 2 atmospheres. Line 38 directs the aerated, pressurized water to a central, vertically oriented pipe 40 located within the raw water inlet conduit 15. As is best seen in FIG. 5, the conduit 40 terminates in a second rotary joint 40a coupled to a rotating pressurized water distribution pipe 42 which acts as a manifold for a set of pressurized water inlets 44 to the header 17 in the tank 14.

Figure 7:
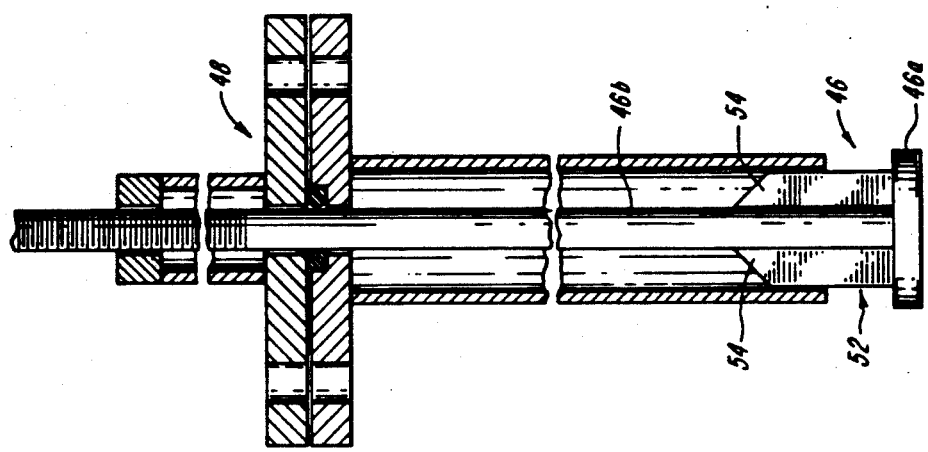
FIG. 7 is a detailed view in vertical cross section plate of the inlet shown in FIG. 6.
Figure 6:
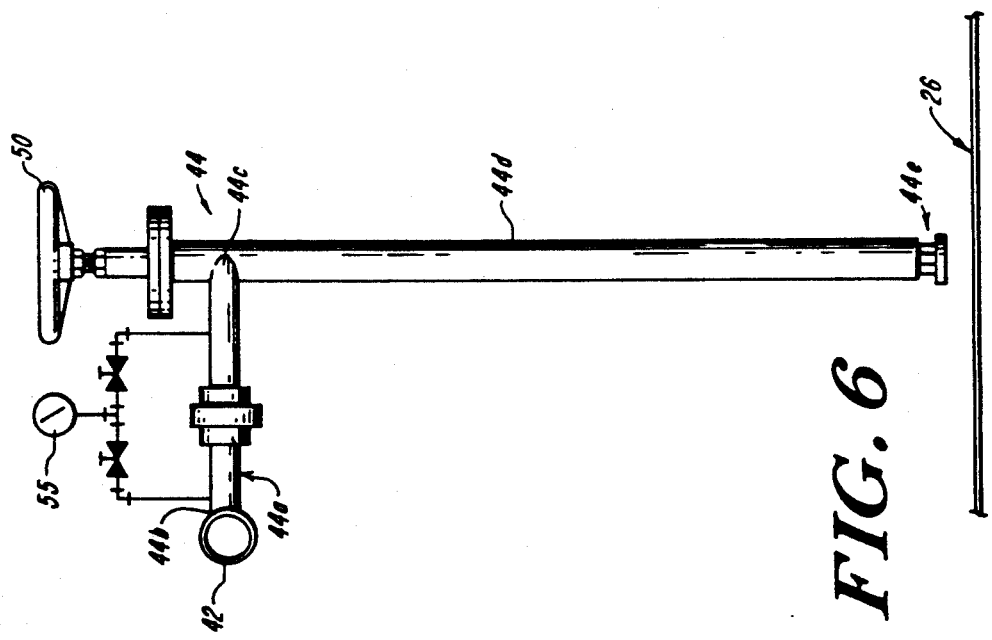
FIG. 6 is a detailed view in side elevation of an adjustable pressurized water inlet for use on the clarifier shown in FIGS. 1-5.

FIGS. 6 and 7 illustrate the preferred construction for the pressurized water inlets secured along the rotating distribution pipe 42. Preferably, one such inlet 44 is associated with each section 19. A horizontal branch pipe 44a connects at its end 44b to the distribution pipe 42 and its other end 44c to a vertically oriented pipe 44d. The pipe 44d is immersed in the water 28 so that the microscopic air bubbles created at the outlet 44e have an upward flow path sufficiently long for efficient separation of the flocculated particles. The outlet 44e is preferably about 2 inches above the floor 26 under the header 17 and the plates 24. The outlet 44e includes a valve member 46 with a horizontal plate 46a, a mounting rod 46e, and vertical guide fins 54 secured between the rod and the plate that center the valve within the pipe 44d. The rod 46e is secured to the center of the plate 46a and extends through the center of the pipe 44d. A flange and o ring seal assembly 48 supports the rod at its upper end and provides a fluid seal. The upper end of the rod 46d is threaded so that rotation of a hand wheel 50 secured at the upper end of the rod 44e raises and lowers the plate 46 with respect to the lower end of the pipe 44d. This adjusts the opening of an outlet orifice 52.

The size of the orifice controls the flow rate and pressure drop as the pressurized water enters the water 28 held in the tank. A pressure gauge 54 connected in parallel with the branch pipe 44a provides a measure of the flow through each outlet pipe into the associated region 25. In operation, each of the end wheels 50 is adjusted until the pressure drops for each outlet 54 is the same and therefore the sam volume of pressurized water added to each region 19 is the same. When the pressures are equalized, the adjustment can be locked by securing the hand wheel 50.

The valve 46 also produces a lateral sheer force as the pressurized water traveling down the pipe 44d strikes the upper surface of the pipe 46a and undergoes a sharp change in direction. The sheer forces thus generated are important in releasing the air dissolved in the pressurized water as microscopic bubbles.

Figure 12A:
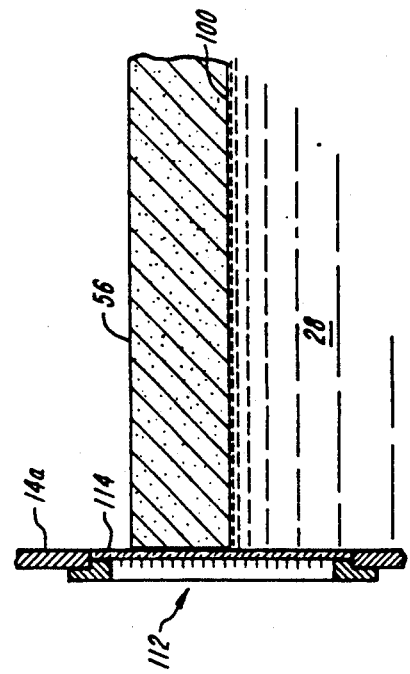
FIG. 12A is a view in vertical section of a sludge-water boundary and turbidity detection array according to this invention mounted on the outer flotation tank wall of the clarifier shown in FIGS. 1-3.
Figure 12B:
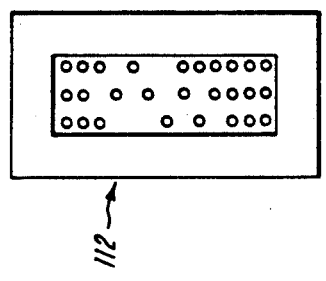
FIG. 12B is a view in side elevation of the array shown in FIG. 12A.

As the air bubbles generated at the orifice 52 rise upwardly along the inclined flow paths in each of the regions 25 they produce a rising stream of flocculating particles that attach to the air bubbles in a manner well known in the art. When the air bubbles reach the surface 100, they form a floating sludge layer 56 (FIG. 12A). The layer is removed mechanically using the rotating scoop 22 which is generally of the construction described in U.S. Pat. No. 4,184,967. It has a central discharge pipe 22a, a set of rotating, curved openings 22c in the central discharge pipe 22 which allow the sludge collected by the scoop to enter the discharge inlet 22a. In the "Supracell" embodiment shown in FIGS. 1–3, the sludge collection enters in a funnel shaped receptacle 58 which directs the sludge to a vertically oriented discharge pipe 60 passing through the floor of the tank. A certain percentage of the particulate contaminants flocs are sufficiently heavy that they do not rise to form a floated sludge. The sludge settles to the bottom of the flotation tank where it is scraped during the rotation of the sludge in the immersed plate assembly secured to the carriage into a compartment 14c which is drained periodically to remove the accumulated sludge.

In operation, the feed pump 13 delivers raw water, with alum added, via the central inlet conduit 15 and the rotary joint 15a to the rotating distribution header 17. The flocculation agent mixes rapidly in the compartment 17c and then the trough 17b which feeds it to the tank via the outlet 17a. Immediately behind these outlet ports (best seen in FIG. 3), the aerated, pressurized water inlets 44 produce a stream of air bubbles which carry the flocculated particles upwardly to form the floated sludge layer 56. Because the scoop is located immediately ahead of the header 17, when viewed in the direction of rotation 20a of these elements, the flotation process has a time interval equal to one complete rotation of the carriage to carry the flocs to the surface of the tank 14 for removal by the scoop. Through this process, clarified water accumulates near the bottom of the flotation tank and is removed via outlets 14a and is directed back to the tank 12. A valve 62 controls the discharge of the clarified water via the outlet lines 64 in response to a conventional level sensor 126 of the water level in the tank 14. Clarified water overflows the tank 12 for end use or flows under a weir 66 and is recycled through the flotation tank. Clarified water is also removed through an outlet 14d and is directed by a conduit 68 through the feed pump 34 supplying the ADT's 32L,32R.

Because of the increased treatment capacity provided by the rotating sets of conical mutually spaced plates operating in conjunction with the rotating header 17, the clarifier generates a floated sludge layer which is typically several times greater than the sludge layer produced with a conventional prior art clarifier of this general type. This increased sludge load is difficult to advance along the central discharge tube 22a. This difficulty arises both from the increased volume sludge being removed, as well as the fact that the sludge may be of a consistency such that it does not flow readily along the central discharge pipe. Therefore another principal feature of the present improved clarifier is a screw conveyor 68 within the central discharge pipe that extends substantially its full length. The screw conveyor is mounted on a shaft 69 journaled end wall 70 which carries a sprocket 72 which is powered by a chain drive and motor 73 to rotate in a direction opposite to the direction of rotation of the scoop itself. A typical speed of rotation is in the range of 20 to 80 rpm. The scoop is rotated, also by a motor 75 and chain drive acting on a sprocket 74, at a speed of rotation that can be varied, typically from 2 to 10 rpm. With the addition of this screw conveyor arrangement, it has been found that even increased sludge loads and the most hardened sludges can be discharged reliably along the central discharge tube to the funnel 58.

The spiral scoop shown in FIGS. 10, 11A and 11B, utilizes two scoops 22b, 22b each feeding collected sludge to an associated, diametrically opposite longitudinal slot 22c, 22c formed in the central discharge tube 22a. A bearing 76 mounted on the moving carriage frame 30 supports the screw conveyor at its outer end. At its inner end, the screw conveyor is supported by journaling rod 62 in a bearing 78 mounted at the inner end of the central discharge pipe 22a. The central discharge pipe 22a itself, and therefore the complete rotating scoop assembly, is supported at the inner or outlet side by a sliding bearing or double rollers 80 also mounted on the rotating carriage 30.

Figure 8:
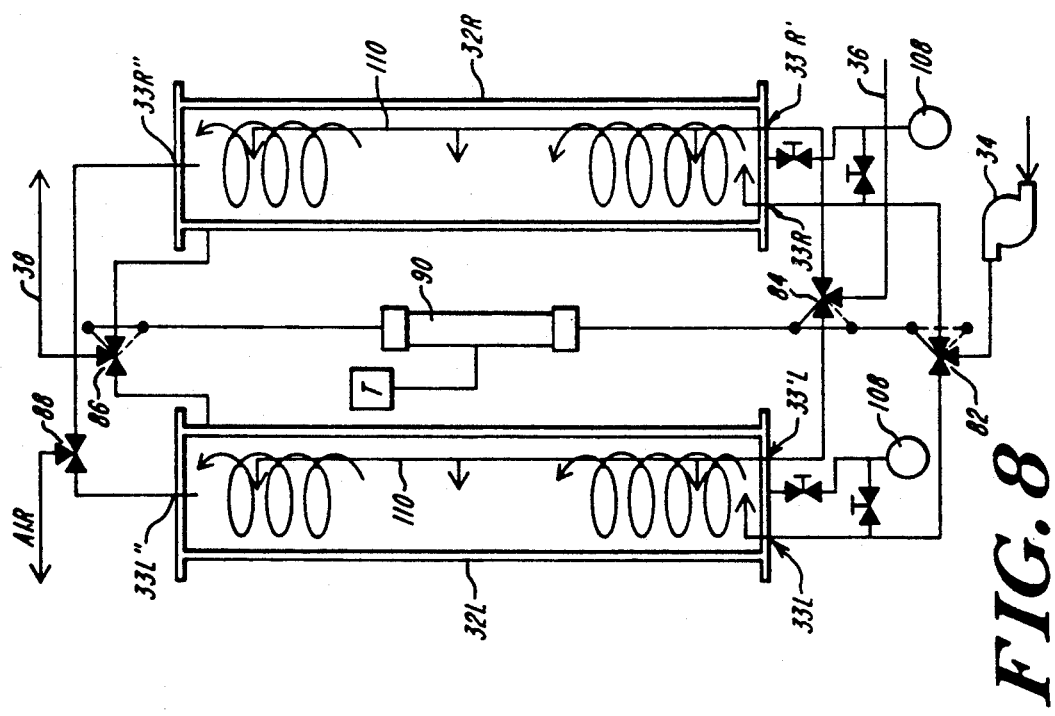
FIG. 8 is a schematic view of the tandem operating ADT's shown in FIG. 1.

Another principal feature of the present invention which provides a substantial savings in the power consumption required to operate the improved clarifier 10 of the present invention, includes the double ADT's 32L,32R operated in tandem to dissolve air in the water without the use of a powerful centrifugal water pump to produce a high pressure in the water itself. Apparatus for carrying out this tandem operation are shown in greater detail in FIGS. 8 and 9. Each ADT is formed from a plane pipe, cylindrical outer shell having flanges and oriented in a upright standing position. Upper and lower end plates 37 mount on the flanges to enclose the shell.

The flow of pressurized water from the pump 34 is directed to one of the inlets 33L,33R via a three way valve 82. The flow of pressurized air from the common feed line 36 is, likewise, fed to one of the inlets 33'L,33'R under the control of a second three way valve 84. Further, the outlet of pressurized, aerated water from the ADT's to the common outlet line 38 is controlled by a third three way valve 86, which depending on its position, allows only one of the ADT's to discharge its aerated water to the common feed line 38. A fourth 3-way valve 88 bleeds off the excess air through line 33 at the time of aerated water discharge. A water lock closes automatically when air is bled off. Each of the valves 82, 84, 86 and 88 are linked to and operated by a common linear actuator 90, such as a pneumatic cylinder. The actuator 90 is operated under the control of a timer T which causes the actuator to move between one of two limit positions ("upper" and "lower", as shown) with the actuator in each limit position for an equal time interval corresponding to a half cycle of operation. In one limit position the valves 82, 86 and 88 permit the flow of water into and out of the ADT 32L and the valve 84 blocks the flow of pressurized air to that same ADT. At the sam time the valves 82, 84 and 86 block the flow of water to the ADT 32R and permit a flow of pressurized air to the other ADT 32R. During the second half cycle of operation, the actuator 88 moves under control of the timer T to its other limit position which reverses in unison the positions of the valves 82, 84 and 86. Water flow to and out of the ADT 32L which was opened is blocked and pressurized air is directed into the now sealed and water filled ADT 32L. At the same time, the water which has just been aerated in the previous half cycle is displaced from the ADT 32R by the incoming water from the feed line.

Figure 9:
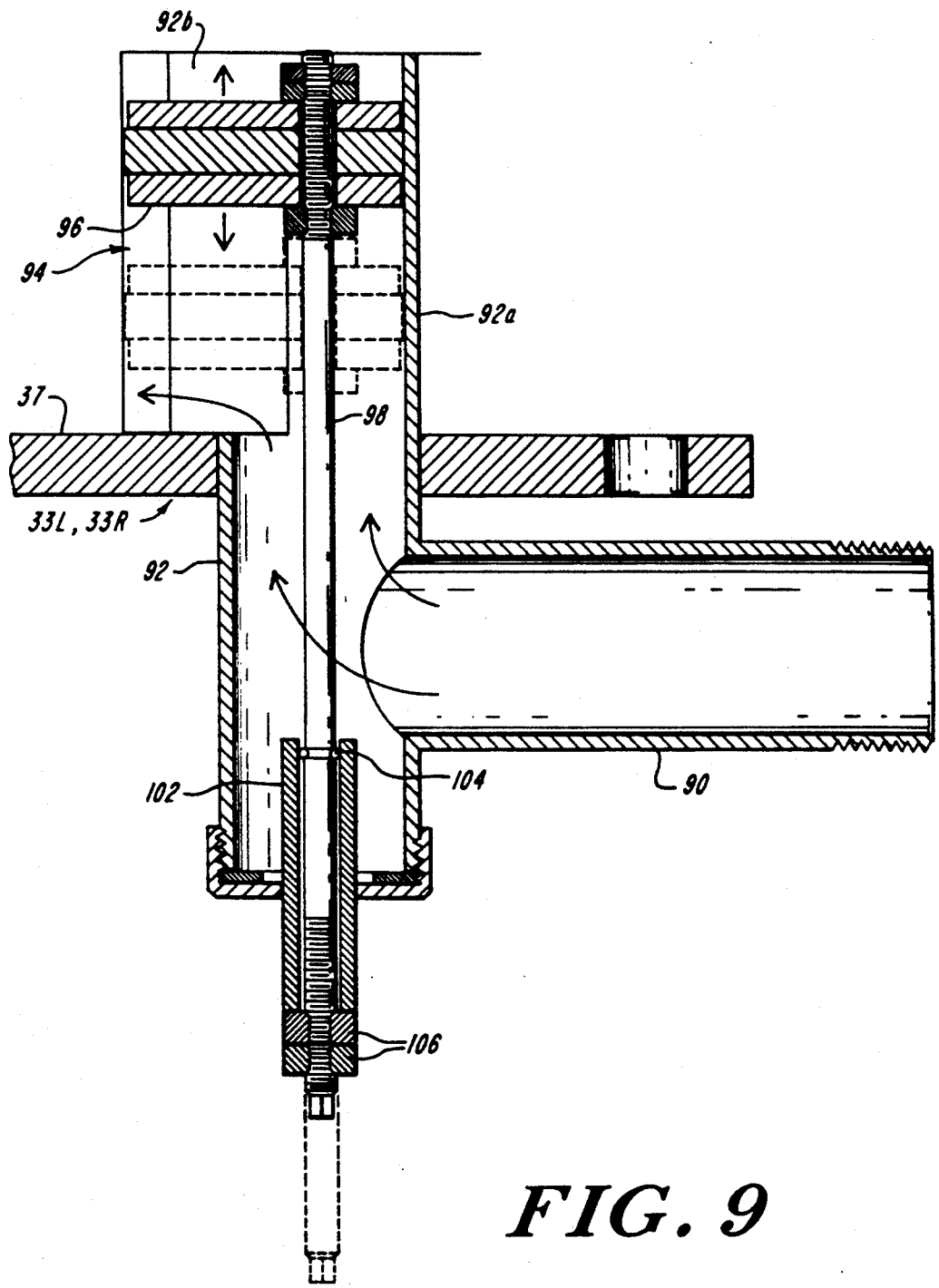
FIG. 9 is a detailed view in vertical section of the adjustable tangential flow inlet of each of the ADT's shown in FIG. 8.

FIG. 9 shows the water inlets 33'L and 33'R in detail. Water from the feed pump 34 enters the ADT via conduits 90 and 92. The conduit 92 is oriented vertically and is positioned at or near the cylindrical outer wall of the ADT, as shown. The inlets each include a jet opening 94 directed tangentially with respect to the ADT outer wall and narrowing to accelerate and direct the fluid flowing through the inlet into the ADT. Each jet opening includes an upper portion 92a of the conduit 92 that extends upwardly into the ADT as well as a pair of narrowing tangentially directed side walls 92b,92b. A vertically movable valve plate 96 is located within the portion of the conduit 92 forming the jet opening. A rod 98 controls the vertical position of the valve plate 96. The rod 98 is secured at its upper end to the valve plate and guided at its lower end in a sleeve 102 acting in cooperation with an o-ring seal 104 and a pair of nuts 106, 106 threaded on the lower end of the rod 98 to adjust its vertical position, and then secure it. The vertical position of the valve plate 96 regulates the inlet flow volume and velocity as measured indirectly by a pressure gauge 108 suitably connected between the inlet conduit and the ADT.

A perforated plate 110 is mounted to extend vertically along one side of the ADT's to define a chamber 111 that receives the pressurized air to be dissolved in the water. The plate is preferably formed from a flat stainless steel plate and has perforations 20 to 40 microns in diameter. The tangential jet openings 94 in the inlets 33'L and 33'R each create a rapidly swirling water flow within the ADT that forces the water through the perforations into the chamber 111 where the dissolution occurs.

It is significant that during the operation, the tubes are completely closed after the tube is filled with water and fed only by compressed air. The pressure is therefore increased in the tube and dissolution of the air into the water is achieved only with the energy required to compress the air to the pressure range specified above. This is a relatively low energy input as compared with that required to bring water, which is incompressible, up to 80 psi of pressure as in prior art single ADT's. The water pump 34 in the present system is therefore required only to bring the water from the point under the clarifier tank 14 up into the clarifier, fed through the inlets 44. If the pump 34 is fed directly with the clarifier, there is only the piping loss pressure to be compensated: However, to create the desired flow rates at the ADT inlets and thereby produce the desired rapid swirling of the water within the tubes, the pump 34 preferably delivers water to the inlets 33L,33R at a pressure of about 2 atmospheres. The compressed air input to the ADT's is typically at a pressure of 3 to 8 bars (kg/cm$^2$), which is equivalent to 44–118 psi. Preferably the compressed air is at 100 psi which is equivalent to about 7 atmospheres. For a standard ADT with a diameter of approximately 8 inches, a pressure drop of about 0.5 bar (7.3 psi) at the water inlet produces an inlet water velocity at the jet outlet of approximately 10 m/sec. Further, with a tube diameter of about 8 inches, which is typical, this velocity produces a rotational of the water in the tubes at about 955 rpm. The interval for a half cycle of operation is preferably in the range of 10–15 seconds. Centrifugal pumps 34 with varying speed controls can provide additional power savings. Depending on the particular installation, the total power savings of the tandem operating air dissolving ADT system described above as compared with a standard full flow pressurization using a single ADT of the type which has been used in prior art systems is 50% or more.

Because of the increase treatment capacity of the clarifier 10, it is important to improve the control and coordination of the action of various subsystems in order to (1) control the flotation velocity and (2) maintain a layer of floated sludge on the flotation tank. Another principal feature of this invention is therefore a floated sludge level and turbidity detector 112 shown in detail in FIGS. 12a, 12B, 13A, 13B.

Figure 13A:
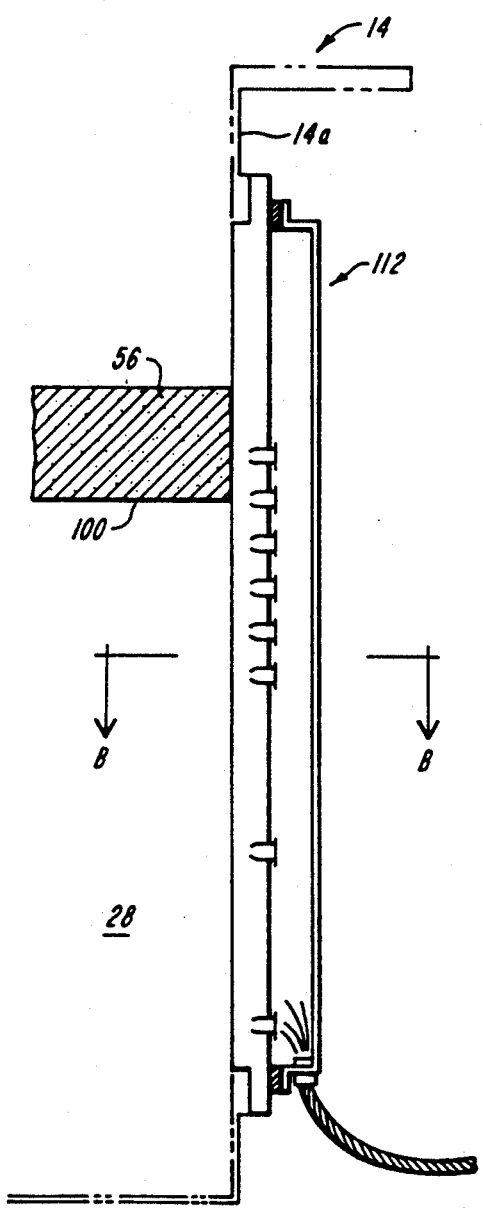
FIG. 13A is a detailed view in vertical section of the array shown in FIGS. 12A and 12B.
Figure 13B:
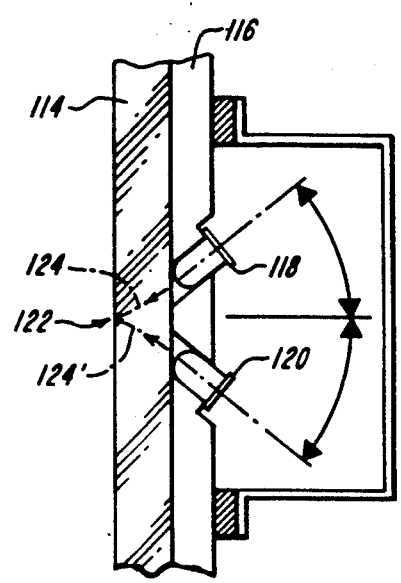
FIG. 13B is a view in horizontal section along the in B—B in FIG. 13A.

In the preferred form illustrated, the detector 112 includes a glass window 114 mounted in the side wall 14a and extending vertically to include at least the upper and lower anticipated positions of the sludge layer 56 during operation, and preferably extending sufficiently below the water line to monitor the upward movement of a sludge layer rising as a stream of air bubbles is released by the rotating inlets 44. A mounting panel 116 located adjacent the window supports a vertically spaced array of radiation transmitters 11 and receivers 120 operating as coupled pairs. In a preferred form a photodarlington transistor acts as a receiver 120 and an infrared light emitting diode acts as the transmitter 118. As best seen in FIG. 13B, the transmitter and receiver are both positioned at an angle of 30° to 60° from a line perpendicular to the exterior surface of the window 114, and preferably at about 39°. The angular position and mutual spacing of the transmitter and receiver is such that they focus on a common point 122, accounting for the refraction induced by the glass 114, which is at the interior surface of the window 114 immediately adjacent the sludge, water or air held in the flotation tank. As is best seen in FIG. 13A, the pairs are preferably mutually spaced at equal intervals, e.g. 0.5 to 1.0 inch over the region where the water sludge boundary is expected to be found.

In operation a beam of infrared light 124 emitted by each diode 118 is refracted at the air-glass interface at the outer surface of the glass window 114, traverses the glass window 114 to the associated vertical point 122 where it is reflected off of the contents within the tank, whether sludge or water. The reflected light, indicated by beam 124' in FIG. 13B, traverses the window 114, is refracted at the glass-air interface and is received at the associated transistor 120 where it is converted to a current signal. The amplitude of the current produced at each receiver 120 varies as a function of the amplitude of light 124' reflected at the associated vertical point 122, which in turn is a function of the material in the tank 14 adjacent the glass at that point. The amplitude of infrared light reflected by sludge and water vary a significant amount so that the current signal can be reliably interpreted as an indication of whether sludge or water is present at the points 122. To utilize the current output in a control circuit, the current signal is preferably converted to a voltage signal, which is then compared to an adjustable set point voltage by a comparator circuit, all of which utilize well known, conventional designs. The output of the comparator is a digital signal which is used as an input to a programmable controller 124, also of conventional design, which produces output signals depending upon the inputs received from the vertical array of transmitter receiver pairs in the detector 112 to control the rate at which the sludge layer is removed, the dosage of flocculating chemicals added to the raw input water, and the rotational speed of the carriage 20.

To provide a continuous measurement of the thickness of the blanket of floated sludge, the water level detector 126 first determines the upper boundary level of the sludge layer. The sensor array 112 determines the bottom level of the sludge layer 56. The sensors make a measurement just before the scoop 22 passes the sensor array. The sensors are preferably spaced 0.5 inch apart vertically. The output of the receivers 120 are compared to a reference voltage for clear water so that the photo detector array 112 provides the desired lower boundary level information from which the thickness can be calculated by the controller 112. If the blanket is too thick, the controller generates an output signal to the motor 75 which controls the speed of rotation of the scoop 22. If increasing the scoop speed does not control the sludge laser thickness, then the water level 100 is increased using a signal generated by the controller 112 which adjusts the outlet valve in the clarified water discharge line 64. If the sludge layer thickness decreases, first the controller will adjust the water level downwardly from any previously increased level, and then as a second order of correction, will decrease the speed of rotation of the scoop 22. The system adjusts itself once per revolution of carriage 20, and therefore has a response time equal to the time required for the carriage to make one revolution.

Figure 14:
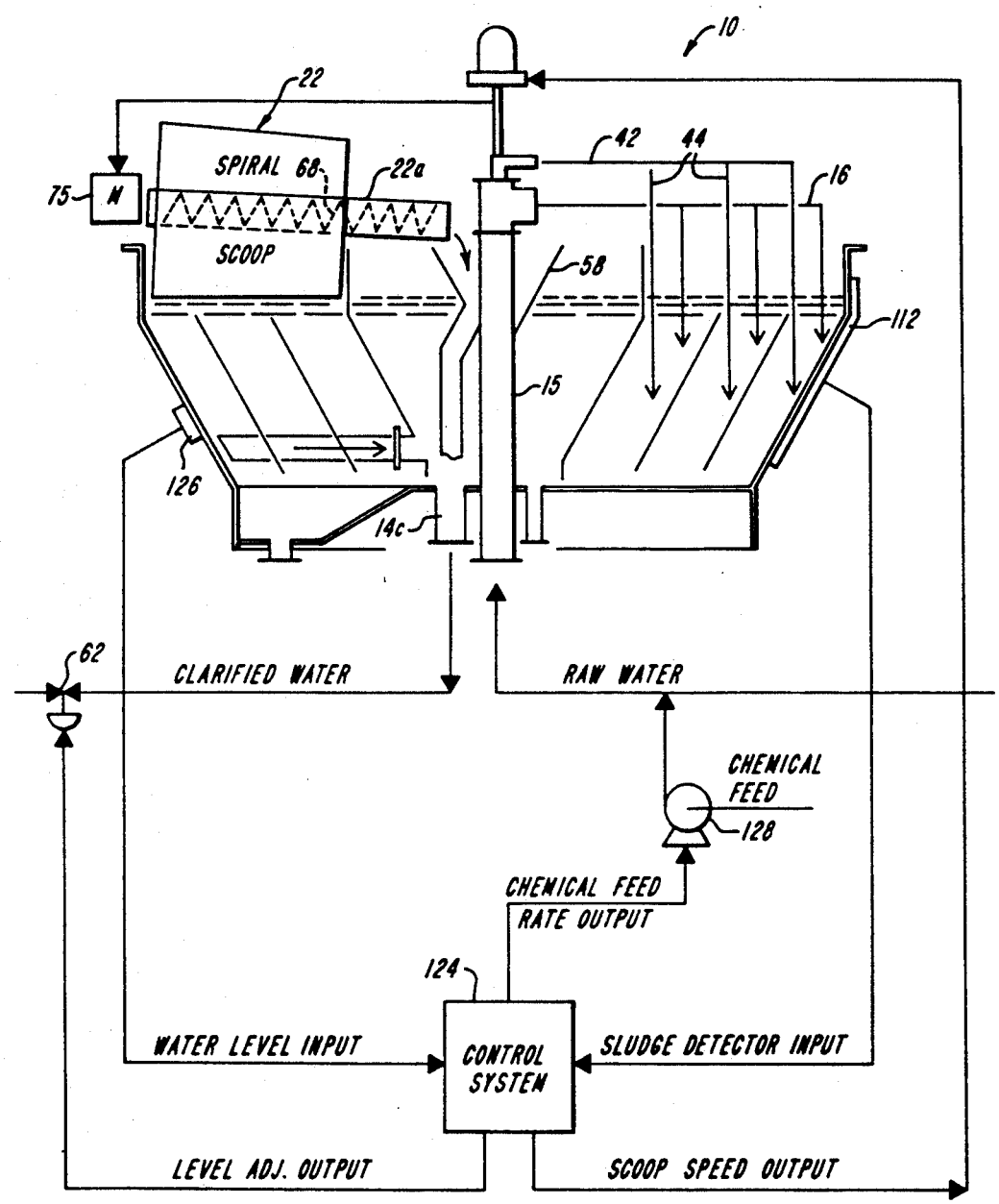
FIG. 14 is a schematic view of a control system for the clarifier shown in FIGS. 1-3 using the detection array shown in FIGS. 12A-13B.

The sludge detector 112 can also be used to monitor the flotation velocity through the use of a series of transmitter-receiver pairs 118, 120 spaced vertically throughout the full depth of the flotation tank 14 as shown best by the detector array 112' in FIG. 14. For this application, the sensors are spaced vertically over a depth of 18 inches (for a flotation tank 14 having a maximum depth of 20 inches) with sensors set at heights of 4, 8, and 12 inshes, and then at 1 inch intervals from 12 to 18 inches. The received radiation at the receivers 120 is a measure of the amount of flocculated particles present in the water adjacent the window at the corresponding point 122. Since the inlets 44 rotate through the tank and therefore emit a stream of air bubbles flocs rise through the water 28 as a floated suspended solids layer. The array 112' can sense the presence or absence of the suspended solids layer as it floats upwardly past the array. If the flotation velocity is such that the complete suspended solids layer has not floated to the bottom of the floated sludge layer 56 in the time required for one revolution of the carriage, then the controller 124 will produce an output signal to adjust a variable chemical feed apparatus 128 in the raw water input line to the vertical conduit 15.

Figure 15:
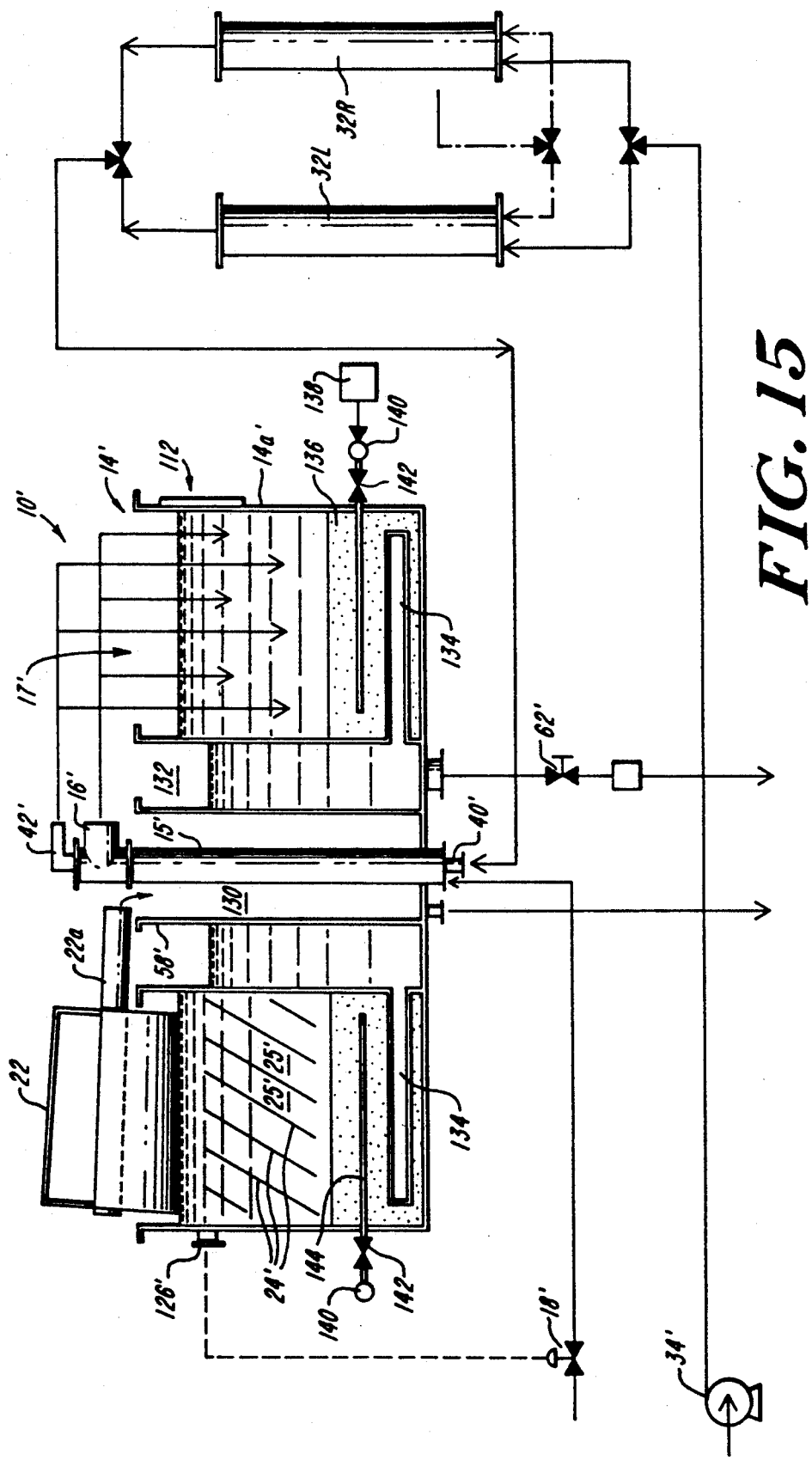
FIG. 15 is a schematic view corresponding to FIG. 1 of an improved sandfloat type clarifier incorporating features of the present invention.

FIG. 15 shows an alternative embodiment of the invention where certain of the features described above in connection with a Supracell type clarifier 10 are adapted to a Sandfloat type clarifier 10' (like parts being identified with the same reference number, but primed). The clarifier 10' utilizes a generally cylindrical flotation tank 14' centered on a vertical raw water inlet pipe 15' and a pressurized, aerated water inlet pipe 40' located within a raw water conduit 15'. As with the clarifier 10, a pair of rotary joints connects these conduits to a rotating raw water distribution pipe 16' and a rotating pressurized water distribution pipe 42' both feeding the flotation tank 14'. The pressurized aerated water is produced, as in the Supracell embodiment, by a pair of ADT's 32L and 32R operating in parallel as described herein above. A rotating scoop 22', preferably utilizing a screw conveyor 68' within a central discharge pipe 22a', feeds the collected floated sludge to a central cylindrical collection compartment 130 defined by a cylindrical wall 58' corresponding in function to a funnel 58 in the FIGS. 1-3 embodiment. Immediately surrounding the sludge compartment 130 is an annular collection compartment 132 for clarified water absorbed through perforated clarified water inlet pipes 134 emitted in a sand bed 136 located at the bottom of the flotation tank 14'.

As in the Supracell embodiments of FIGS. 1-3, a plurality of conical, mutually spaced, rotating plates 24' define flotation regions 25' within the flotation tank 14' with the plates overlapped to produce an enhanced projected area in the same manner as the rotating plates 24 described above. As in FIGS. 1-3 embodiment, the plates are uniformly and closely spaced. The raw water entering the tank 14' has a net zero velocity.

In addition to the conventional backwashing system of the sand bed 136, the present invention also provides a steam boiler 138 which provides steam to a circular ring 140 surrounding the sand bed with individual connections through solenoid valves 142 to individual steam distribution pipes 144 located in each wedge shaped cell of the sand bed 136. Short injections of steam produce a violent mixing of the sand for a few seconds during the backwash which substantially enhances the sand cleaning action of the backwash.

Fluid flows through the clarifier 10' include a raw water inlet controlled by a main valve 18' which feeds the pipe 15'. The main valve is fed by gravity. A flotation tank level regulating sensor 126' controls the valve 18' to adjust the inlet flow in coordination with the clarified water level in the compartment 132 as regulated by clarified water outlet valve 62'. A low pressure centrifugal pump 34' supplies pressurized water to the double ADT's 32L, 32R which feed a pressurized air/water solution to the main inlet 40' and into a flocculator 17' rotating in the tank 14' the location of the flocculator being designed by arrows schematically showing the inlet of raw water and pressurized water at the right hand side of a flotation tank 14'.

A side window 114' and infrared photo detector array 112' located in the side wall 14a' of the flotation tank 14' provides output signals which allow the calculation of the thickness of the floated sludge layer and the flotation velocity of the flocs in the flotation tank 14'. As described above with respect to FIGS. 12a-13B, the sludge detector 112' controls the rate of operation of the scoop, the water level, and the rate at which flocculating chemicals are added to the raw input water.

Figure 16:
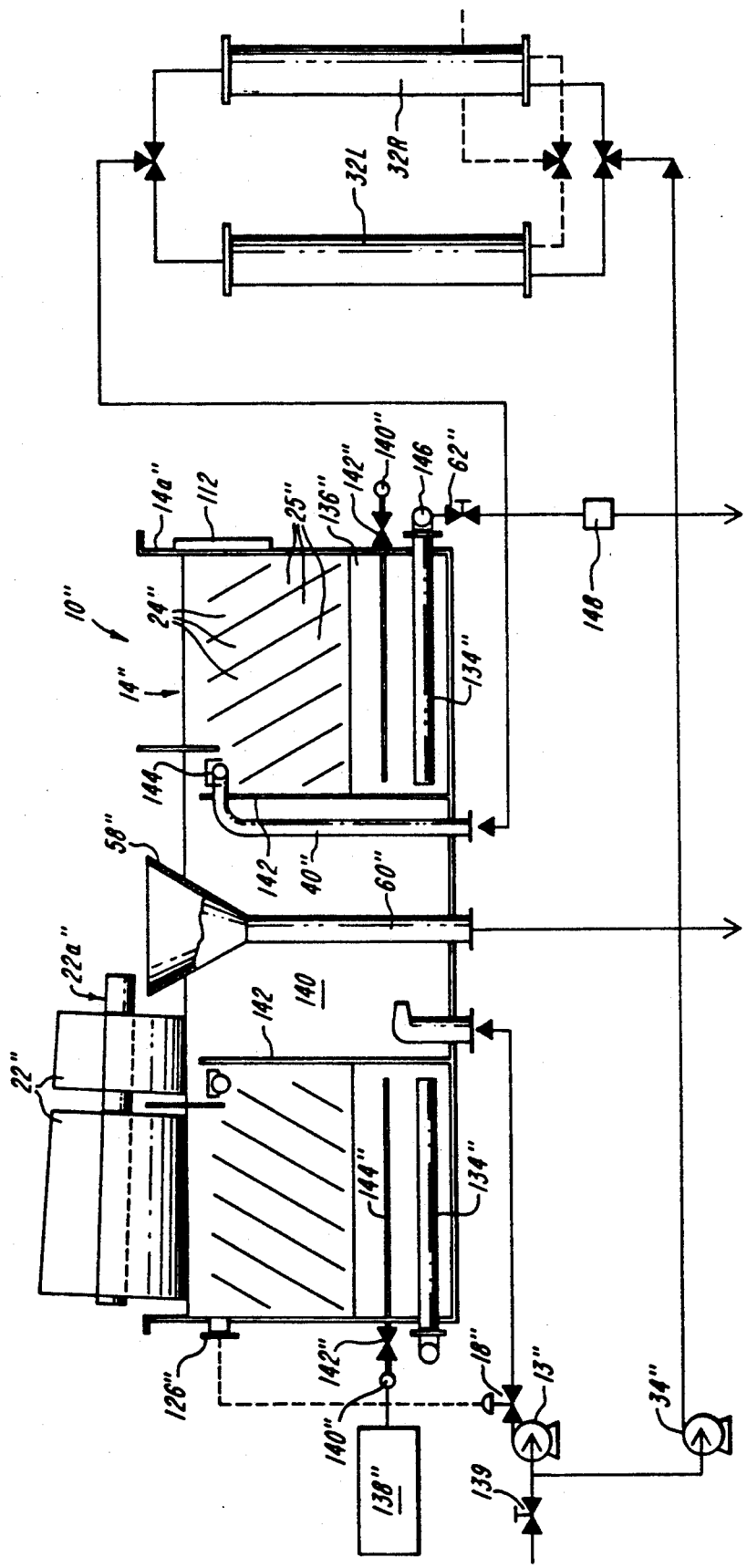
FIG. 16 is a schematic view corresponding to FIGS. 1 and 15 of an improved SASF type clarifier incorporating features of the present invention.

FIG. 16 illustrates a still further alternative embodiment of the present invention where a set of rotating, conical plates 24" (like parts again having the same reference number) define a plurality of concentric flotation compartments 25" in a flotation tank 14" of an SASF type clarifier 10". Raw water enters through a main valve 18" and, if the original water pressure is not sufficient, is fed by a pump 13" to a central raw water holding tank 140. The flotation tank 14" has a level sensor which controls the valve variable raw water inlet valve 18" which is adjusted to modify the inlet flow in conjunction with the clarified water demand set by a clarified water outlet valve 62" a low pressure pump 34" feeds raw input water to double air dissolving tubes 32L and 32R which produce pressurized air/water solution that is fed via a conduit 40" passing through the compartment 140 and a dividing wall 142 to an upper, inner distribution ring 144 located in the flotation tank 14". The operation of the double ADT's 32L, 32R is the same as described above with respect to the clarifier 10. Clarified water inlet pipes 134" imbedded in individual wedge shaped cells of a sand bed 136" located at the bottom of flotation tank 14" extracts clarified water from the unit 10" and directs it to a common outer pipe ring 146 which is discharged through the valve 62" and a flow meter 148 to its end use application. The discharge through valve can be by gravity or pump to give sufficient pressure drop through the filter sandbed.

As in the sandfloat clarifier 10' illustrated in FIG. 15, a steam generator 138" fits into a circular pipe ring 140" surrounding the flotation tank which then directs the steam through solenoid valves 142" to individual steam distribution pipes 144" imbedded in cells forming the sand bed 136". Short bursts of steam again produce a violent mixing of the sand during the backwashing operation, which is otherwise the same as described in the aforementioned '345 SASF patent. The clarifier 10" also includes a rotating scoop 52" which has an inclined central discharge pipe 22a" feeding a funnel shaped sludge collecting trough 58" feeding a vertical sludge discharge conduit 60". In addition, the clarifier 10" utilizes a sludge detector 112" mounted on the side wall 14a" of the flotation tank to measure the lower boundary of the sludge level and to measure the flotation velocity and thereby control the operation of the clarifier 10" in a manner as described with respect to FIG. 14.

There has been disclosed an improved water clarifier operating on the flotation principle which provides substantially enhanced treatment capacity as compared to comparable flotation units known heretofore with no increase in the size of the unit. This improved treatment capacity is achieved in circular flotation tanks which are shallow and of comparatively compact size. This improved treatment capacity is also achieved in a manner which can be adapted to existing units to thereby improve their performance. The improved clarifier also offers substantial reductions in the power requirements needed to operate it and provides reliable and comparatively simple controls, which enhance the coordination of the operation of the various subsystems of the clarifier to provide a more efficient and a more fully automatic operation.

While the invention has been described with respect to its preferred embodiments, it will be understood that various modifications and alterations will occur to those skilled in the art. For example, while the invention has been described with respect to plates that are strictly conical, and therefore linear in cross section, it is possible to utilize plates having variations in cross sectional geometry provided that they use the desired increased flow path for the flocs carried upward on the rising stream of air bubbles in with a minimum of turbulence in the water as the plates are rotated through the flotation tank. Also, while this invention was described with respect to the clarification of water, it will be understood that the principles and feature described herein can be used to clarify other liquids. Therefore "water" is to be understood to include other liquids capable of sustaining a separation of suspended solids by flotation techniques. These and other modifications and variations are intended to fall within the scope of the appended claims.

What is claimed is:

1. Apparatus for producing a supply of pressurized, aerated water from supplies of inlet water and pressurized air and delivering it to a main inlet, comprising:

a pair of air dissolving tubes (ADT's) each having means for inletting the water, means for inletting the pressurized air and means for outletting the pressurized, aerated water, a first three way valve that directs the inlet water to one ADT inlet means while closing the other inlet means, a second three way valve that directs pressurized air to one ADT inlet means while closing the other ADT inlet means, a third three way valve that connects the outlet means of one ADT to said main inlet while closing the other ADT outlet means, and means for operating said valves in coordination with one another so that during one half cycle of operation said water inlet means and outlet means from one tube is closed while said air inlet means of the same tube is open and said water inlet means and outlet means to the other ADT are open while its air inlet means is closed, the positions of said valve means being reversed during a second half cycle of operation.

2. In apparatus for clarifying raw water containing particulate contaminates where the apparatus includes (i) a cylindrical flotation tank, (ii) an inlet means to the flotation tank for raw water, (iii) flotation tank inlet means for aerated water that also feeds the flotation tank, (iv) means for controlling the water level within the tank, (v) means for removing floated sludge from the surface of the water held in the tank which is formed by a flow of rising air bubbles released from the aerated water in the tank which coalesce with particulate contaminants from the raw water and with a flocculation agent introduced into the flotation tank, and (vi) clarified water outlet means for directing the clarified water with contaminants thus removed from the flotation tank, wherein the improvement comprises means for producing a supply of pressurized, aerated water to said flotation tank inlet means from supplies of water and pressurized air comprising, a pair of air dissolving tubes (ADT's) each having means for inletting the water, means for inletting the pressurized air and an outlet means that connects to said flotation tank inlet means for the pressurized, aerated water, a first three way valve that directs inlet water to one ADT inlet means while closing the other inlet means, a second three way valve that directs pressurized air to one ADT inlet means while closing the other ADT inlet means, a third three way valve that directs the outlet means of one ADT to said aerated water inlet means while closing the other ADT outlet means, and means for operating said valves in coordination with one another so that during one half cycle of operation said water inlet means and outlet means from one tube is closed while said air inlet means of the same tube is open and said water inlet means and outlet means to the other ADT are open while its air inlet means is closed, the positions of said valve means being reversed during a second half cycle of operation.

3. The improved clarifying apparatus of claims 1 or 2 wherein said operating means comprises a valve actuator connected to said first, second and third valve means.

4. The improved clarifying apparatus of claims 1 or 2 wherein said ADT water inlet is a nozzle that directs the water into the associated ADT tube t and generally transversely to the longitudinal axis of the tube.

5. The improved clarifying apparatus of claim 4 wherein said nozzle is adjustable to vary the flow rate and velocity.

6. The improved clarifying apparatus of claim 4 where each ADT has a porous panel extending longitudinally within the ADT and said air inlet is fed to the region under the panel.

* * * * *